United States Patent [19]
Faris

[11] Patent Number: 5,146,415
[45] Date of Patent: Sep. 8, 1992

[54] SELF-ALIGNED STEREO PRINTER

[76] Inventor: Sades M. Faris, 24 Pocantico River Rd., Pleasantville, N.Y. 10570

[21] Appl. No.: 655,821

[22] Filed: Feb. 15, 1991

[51] Int. Cl.$^5$ .............................................. G06K 15/00
[52] U.S. Cl. ................................................................ 395/101
[58] Field of Search ................................ 364/518–523, 364/235 MS File, 237.7 MS File, 929.3 MS File; 350/130, 132, 144, 370, 407; 352/60; 346/134, 135.1, 136; 250/550; 356/2

[56] References Cited

U.S. PATENT DOCUMENTS

| | | | |
|---|---|---|---|
| 2,623,433 | 12/1952 | Stipek | 350/132 |
| 3,659,939 | 5/1972 | Hobrough | 250/558 |
| 3,829,838 | 8/1974 | Lewis et al. | 364/200 |

Primary Examiner—Arthur G. Evans

[57] ABSTRACT

A self-aligned system for producing 3-D stereoscopic graphic hard copy output from computers is described. The left and right stereo images from the computer are spatially modulated, spatially multiplexed and then printed on a special paper. This special paper consists of a micro-polarizer array sheet is coated with a photosensitive emulsion and is laminated to a polarization preserving reflective sheet. The spatially multiplexed stereo pair when printed on the micropolarizer and viewed with appropriately polarized glasses, 3-D stereo images will result with full depth perception realized. The micropolarizer sheet serves as a spatial demultiplexer to separate the left and right images and codes them by means of two polarization states. The polarized spectacles serve as decoders and present to the left eye the left image and to the right eye the right image. This invention is an extension of earlier embodiments, and adds the self-aligned feature. It eliminates the previously required mechanisms to align the μPol to the printed SML. The improved printer is much simplified and less costly to produce.

14 Claims, 4 Drawing Sheets

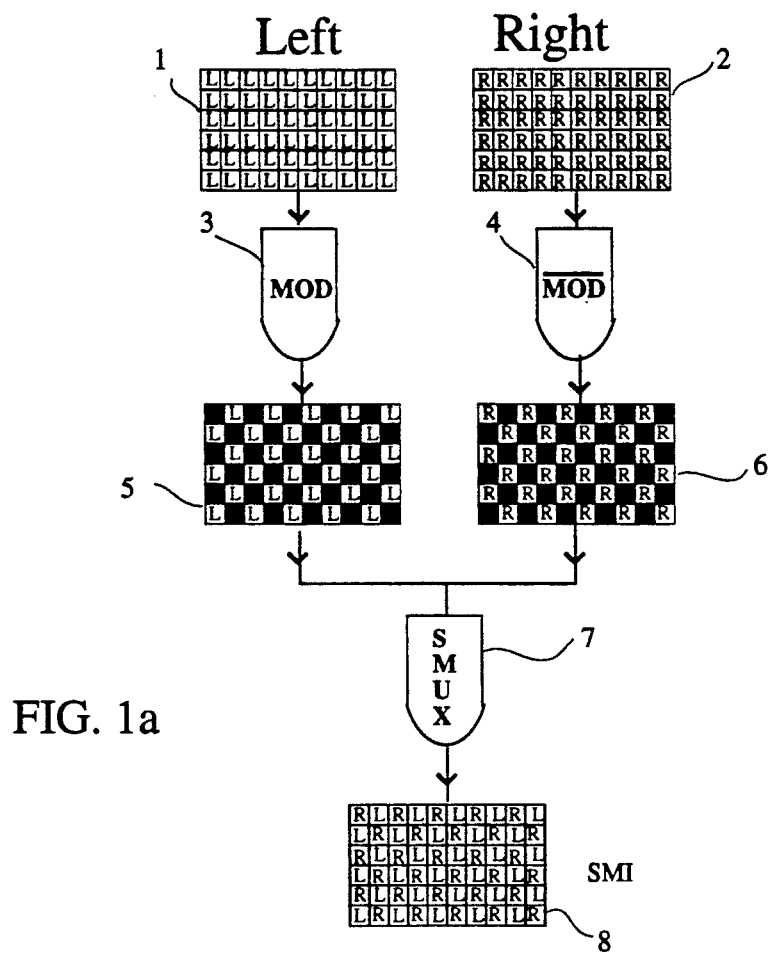
FIG. 1a
FIG. 1b
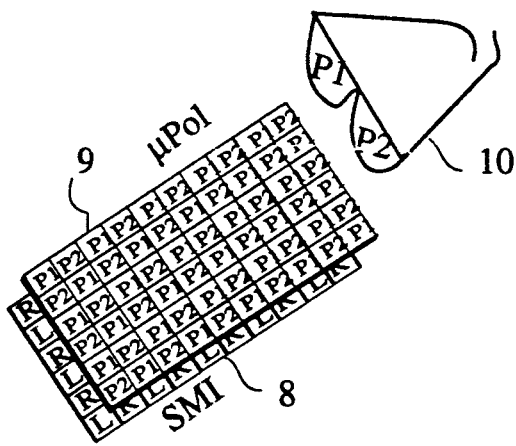
FIG. 1c
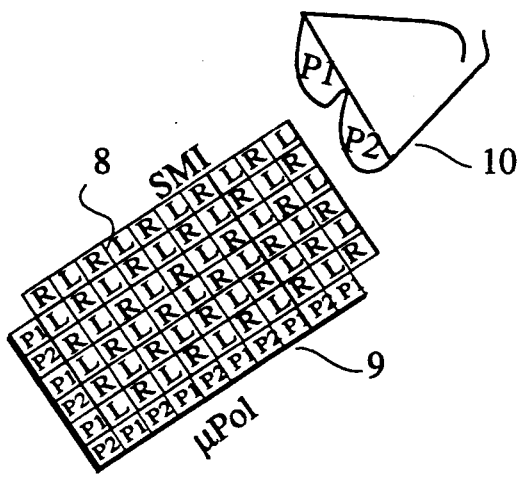

Figure 3a
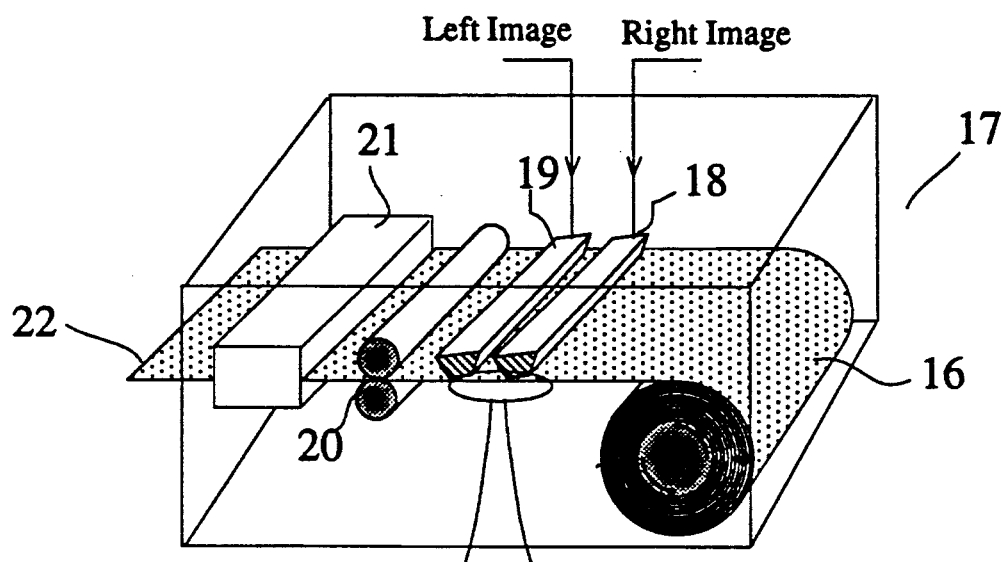
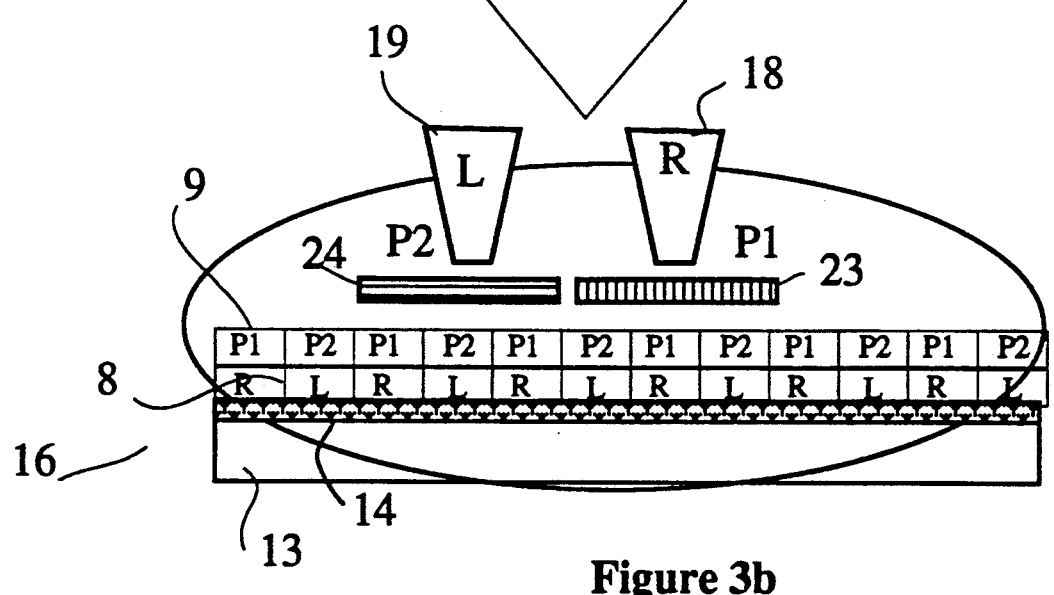
Figure 3b

Figure 4a
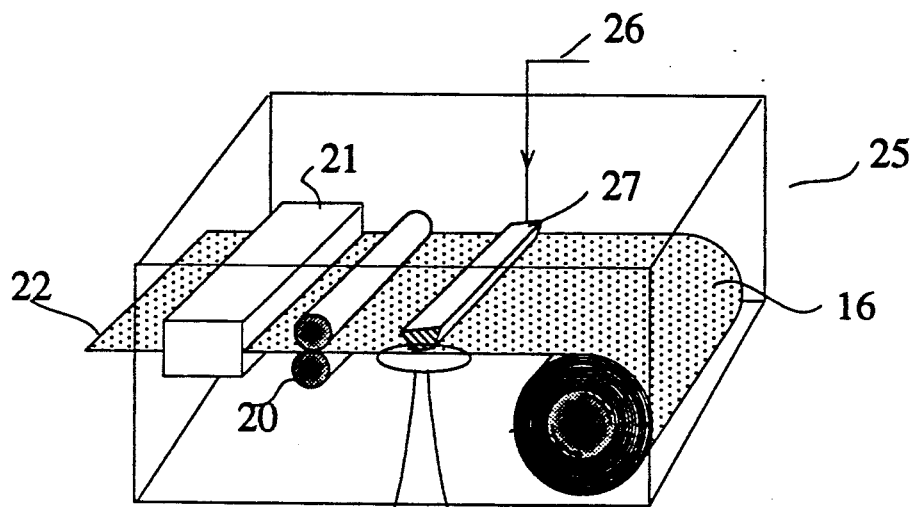
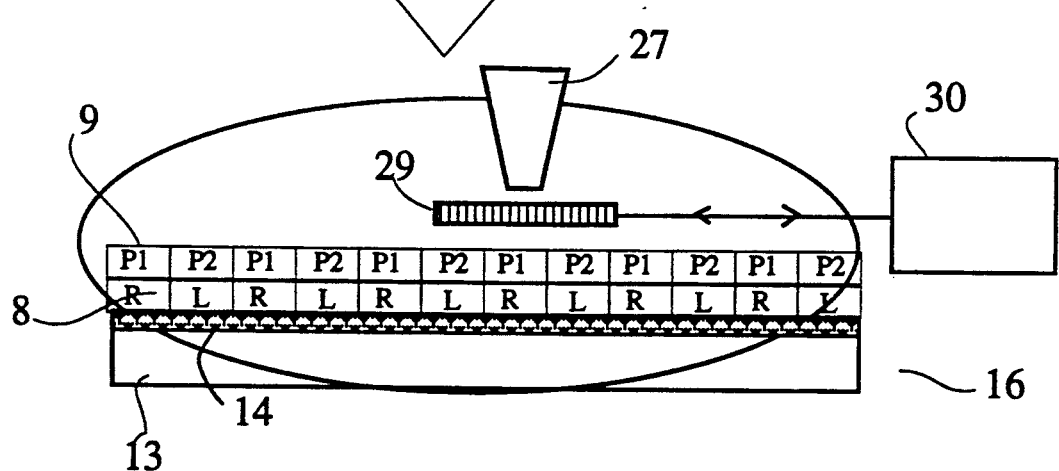
Figure 4b

SELF-ALIGNED STEREO PRINTER

BACKGROUND OF THE INVENTION

1. Field of the Invention

This invention relates to the field of computer hard copy output devices. In particular it deals with color and black and white printers, including laser printers, ink-jet printers, thermal printers and photographic printers. It also relates to the general field of 3-D stereo imaging and recording, and in particular, 3-D stereo computer hardcopy printers.

2. Description of Related Art

In my co-pending application Ser. No. 07/554,742, a stereo printer was described which is based on micropolarizer array, $\mu$Pol, technology described in Ser. No. 07/536,190 and Ser. No. 07/536,419. Said stereo printer required the alignment means to align the $\mu$Pol printing medium to the printing head. This invention describes new self-aligned stereo printer embodiments which eliminate the need for alignment means when specific printing technologies are used, such as photographic printing.

SUMMARY OF THE INVENTION

The principal object of the present invention is to provide computer hardcopy graphic printers which print 3-D stereo images on $\mu$Pol printing medium without the need for alignment means.

BRIEF DESCRIPTION OF THE DRAWINGS

FIG. 1a illustrates the principles behind the stereo printer, spatial modulation and spatial multiplexing of the left and right images.

FIGS. 1b and 1c illustrate the use of micropolarizer sheets for demultiplexing and stereo viewing of the printed image by means of polarized spectacles.

FIGS. 3a-b show the preferred embodiment of this invention, which is a complete self-aligned, self-developing, 3-D stereo computer printing system having two print heads for parallel exposure of the left and right images.

FIGS. 4a-b show another preferred embodiment of this invention, which is a complete self-aligned, self-developing, 3-D stereo computer printing system having a single print head for sequential exposure of the left and right images

DETAILED DESCRIPTION OF THE PREFERRED EMBODIMENTS

Figure 2:
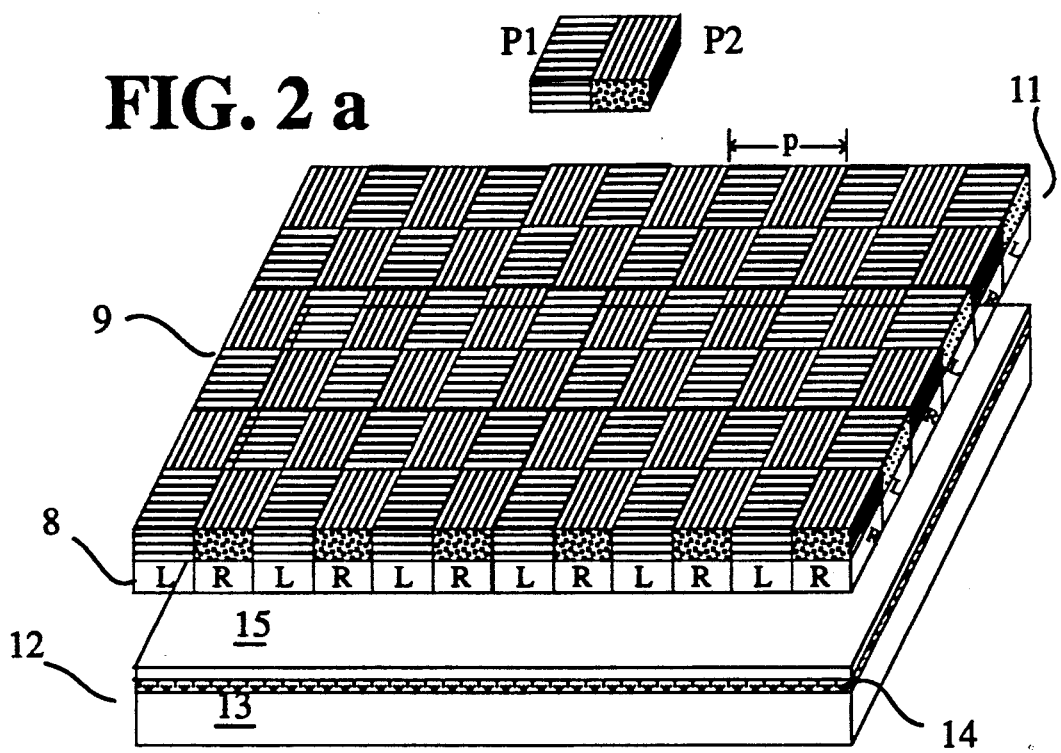
FIGS. 2a-c show the 3-D stereo print made of laminating a printed micropolarizer sheet with a polarization preserving aluminum coated paper.
Figure 2:
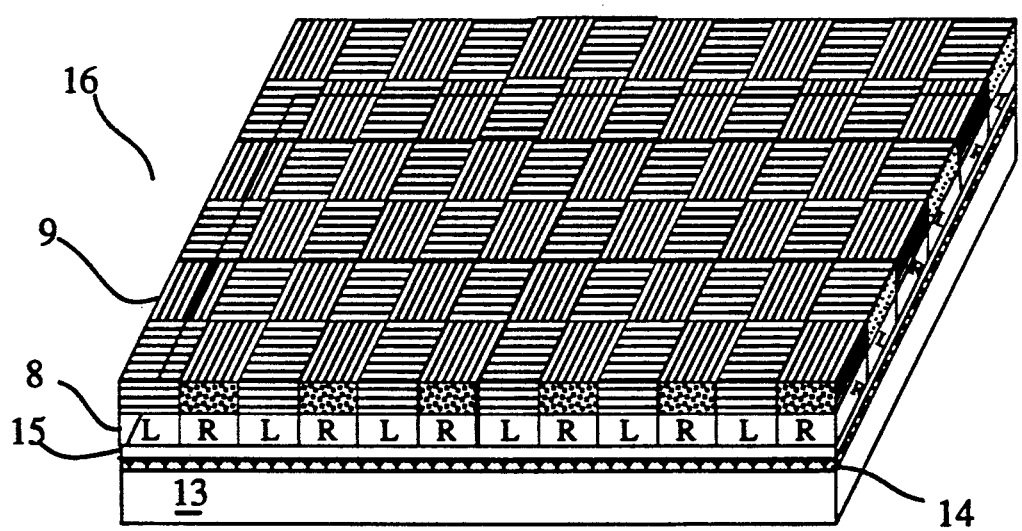
Figure 2:
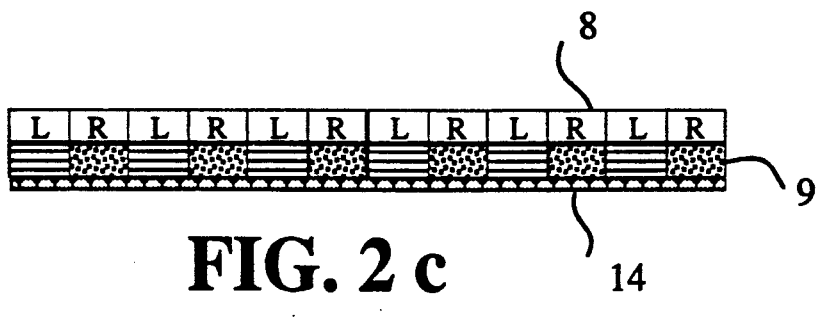

The invention is based on two fundamentally new concepts combined to record and display 3-D stereo images. They are: Spatial Multiplexing of left and right images and Micro-Polarizers Arrays, $\mu$Pol. These concepts are described in my co-pending applications: "A System For Producing 3-D Stereo Images", Ser. No. 07/536,190, and "Methods For Manufacturing Micropolarizers", Ser. No. 07/536,419. These concepts have also been used in my co-pending application Ser. No. 07/554,742, for building the first stereo printer which required an alignement means to align the $\mu$Pol printing medium to the printing head. This invention describes new self-aligned stereo printer embodiments which eliminate the need for alignment means when specific printing technologies are used, such as photographic printing.

FIG. 1a illustrates the spatial multiplexing principles. The data representing the left and right images are stored in a bit map format (other formats may also be used) in left memory array 1 (L-RAM), and right memory array 2 (R-RAM) respectively. Each pixel in the array has N-bits for color and gray-scale. Using a spatial checkerboard modulator MOD 3, the left image 1 is modulated and stored in the array 5. The right image is spatially modulated using the compliment of MOD 4 to produce the compliment pattern stored in array 6. The modulated images 5 and 6 are combined (multiplexed) using a spatial multiplexer 7 and the spatially multiplexed image (SMI) is stored in the array 8. The SMI 8 shows a combined left and right images side by side on a pixel by pixel basis and therefore carries the stereo information. The flow diagram of FIG. 1a is an algorithm to produce the SMI which can be implemented either in hardware, software or by optical means. In Ser. No. 07/554,742, the SMI is generated by means of hardware or software and transmitted to the print head which is then printed on the print medium after appropriate alignment is made. In this invention, the SMI is generated by means of the $\mu$Pol which is part of the print medium as described below. In FIG. 1b the SMI 8 is combined with a spatial demultiplexer 9, a micropolarizer, $\mu$Pol sheet described in application Ser. Nos. 07/536,190, and 07/536,419 and a polarization decoder 10, a pair of spectacles with polarization states P1 and P2. The SMI and the $\mu$Pol arrays which have the same period are aligned such that the left pixels in the SMI illuminate the P2 cells in the $\mu$Pol array and the right pixels illuminate the P1 cells. Thus, the left pixels become P2 polarized and the right pixels become P1 polarized. Because of the discriminating ability of the polarized eye glasses, the left eye which has a P2 polarizer can see only the P2-polarized left pixels, and the right eye which has a P1 polarizer can see only the P1-polarized right pixels. To achieve the 3-D stereo sensation the human brain fuses the left and right images in the same manner it deals with natural 3-D scenes. FIG. 1c shows that the SMI 8 may also be placed top of the $\mu$Pol. Choosing between the configurations of FIG. 1b and FIG. 1c depends on how the SMI is illuminated, and whether the transmissive mode or reflective mode of display is used; see Ser. No. 07/536,190.

In order to build a self-aligned printer to output images from computers in stereo, the above concepts are used in conjunction with the principles taught in the embodiments described here. The self-aligned nature of this printer depends on using photographic print media. FIGS. 2a and 2b show how the final desired hardcopy stereo output is obtained. It comprises two sheets 11 and 12 laminated together to produce the output print 16. The first sheet 11 is a $\mu$Pol 9 on which the photographic emulsion 8 is coated. The second sheet 12 consists of regular paper 13, coated with aluminum or silver flakes 14 and a clear adhesive layer 15. The aluminum or silver layer is needed to preserve the polarization and maximize the brightness. If paper only was used in 13, the polarized light striking its surface becomes depolarized and as it emerges from the $\mu$Pol layer its brightness is reduced by at least 50%. FIG. 2c shows another simpler embodiment which eliminates the sheet 12 but achieves the same result by directly coating the back of the $\mu$Pol 9 with a silver or aluminum film 14.

There are two classes of polarizer polymers; the absorptive class such as polyvinyl alcohol, PVA, and the reflective class such as cholesteric liquid crystal silicone, CLCS (see Robert Maurer et al, Society of Information Display SID 90 Digest, p. 110, 1990, and Martin Schadt, and Jurg Funfschilling, SID 90 Digest, p. 324, 1990). The absorptive class converts unpolarized light to linearly polarized light of state P1 by absorbing the orthogonal state P2. This absorbed light energy is converted to heat and is lost for ever. The polyvinyl alcohol, PVA, used to construct the µPols in Ser. Nos. 07/536,190, and 07/536,419 belongs to the absorptive class. Hard copies based on the absorptive class, in general, lose at least 50% of the illuminating light. The reflective class separates the incident unpolarized light into two circularly polarized states P1 and P2, one state P1 is transmitted and the other state P2 is reflected. In this case no light energy is lost to heat and therefore it is possible to convert 100% of the incident light into polarized light with the desired state of polarization. This is done by coating a sheet of CLCS with a reflective metallic film on one side, and illuminating it on the other side with unpolarized light. 50% of this light is reflected as P1, and the other 50% is transmitted as P2. This P2 light is then reflected by the metallic layer and converted into P1 (it is well known in the field of optics that a circularly polarized light of one state is converted to the orthogonal state as a result of reflection), thus all the incident light is converted to polarized light of state P1. This reflective class of polarizers when used to fabricate µPols, provides at least a factor of 2 brighter 3-D stereo prints than the absorptive class.

Parallel Stereo Printer

In FIG. 3a, the self-aligned parallel stereo printer 17 is described. It comprise two print heads 18, 19 (image sources) which simultaneously (in parallel) expose the µPol-based photographic print medium 16 with the left and right perspectives respectively. The print medium 16 dispensed from a roll or a sheet feeder is transported by transport means 20, past the print heads 18, 19 wjhich expose it with the left and right images simultaneously. After exposure, the print medium is developed by the developer 21 and the finished stereo print 22 emerges for direct stereo viewing using polarized glasses. The spatial multiplexing process described in FIG. 1, is carried out optically in this system as shown in FIG. 3b. The right image from print head 18 is polarized by means of a polarizer 23 having the P1 state and exposes the photographic emulsion 8 only through the P1 parts of the µPol sheet 9. This creates the R pixels in the emulsion 8. Similarly, the left image from print head 19 is polarized by means of a polarizer 24 having the P2 state and exposes the photographic emulsion 8 only through the P2 parts of the µPol sheet 9. This creates the L pixels in the emulsion 8. Thus the SMI according to the algorithm of FIG. 1, is recorded in the emulsion without the need for alignment means. After development, the same µPol sheet 9 used for spatial multiplexing is also used for spatial demultiplexing and viewing of the stereo image. The print heads to expose the photographic medium are either intensity modulated laser beams (Shinya Kobayaashi et al, Society For Information Displays, SID 90, p 280, 1990), cathode ray tubes (J. R. Duke, Japan Display '89, Kyoto Japan) or liquid crystal light valves which are well known in the printing art see (F. Kahn et al, Society for Information Displays, SID 254, 1987) The photographic emulsion in the print medium is based on one of the following:

1. 3M dry silver halides which is developed by simply heating the exposed medium to 270F (Society For Information Displays, SID 89, p 174, 1989).

2. Mead Cycolor which is based on micro-capsules that carry the photosensitive dyes. These micro-capsules harden upon exposure. The development process entails crushing the unexposed micro-capsules to release the color material, while exposed and hardened microcapsules do not release the color material (Charles I. Davis, Society of Information Displays, SID 90, p 501, 1990)

3. Variety of self-developing films used in instant photography by the Polaroid Corporation.

4. Conventional wet processed silver halides.

5. Other photosensitive coatings used for image recording applications.

Sequential Stereo Printer

As shown in FIG. 4a, it is possible to use a single print head 27 to obtain a relatively more compact self-aligned stereo printer 25. In this case, the left image is transmitted first through cable 26 to the print head 27. It then exposes the medium 16 through the variable polarizer 29 (FIG. 4b) which is set at the P2 State. Next, the right image is transmitted to the print head which exposes the medium through the variable polarizer 29 which is now switched to the P1 state by polarization control means 30. The sequentially exposed medium is then advanced to the developer 21 which produces the finished stereo print that is ready for viewing. The variable polarizer 29 and controller 30 comprise two polarizers with P1 and P2 states that are mounted side by side on a substrate, and an electromechanical means. Said electromechanical means moves the polarizers and the substrate sideways under the print head, causing the switching from the P1 to the P2 positions when the right and the left images, respectively, are exposing the print medium. The electromechanical variable polarizer can be replaced by the well known liquid crystal voltage actuated polarization rotator. In the absence of a voltage, the rotator transmits an image having the P1 state, and when a voltage is applied, it rotates the polarization 90 degrees and transmits the image with the P2 state. There are other well known means in the art for implementing the variable polarizer 29 and controller 30 functions.

The print heads 18, 19 and 27 expose the photographic medium 16 by a scanning it with the image line at a time. To increase the writing speed, the entire image may expose the photographic medium. In this case, the print heads have the size of the full image.

What is claimed is:

1. A self-aligned printing system for producing 3-D stereo hard copy computer outputs of graphic images in response to applying the left and right perspectives of an imaged object to its input, comprising:

a. Photo-sensitive printing medium comprising at least one component;

b. Left and right print heads which produce left and right images having two polarization states P1 and P2. The polarized images are used to expose simultaneously the printing medium and to record said images on said printing medium;

c. Micro-polarizer array (µPol) sheets in direct contact with and laminated to the printing medium are used to carry out the spatial multiplexing and the spatial demultiplexing functions;

d. means for feeding, transporting, and combining components of printing medium;

e. means for developing the exposed printing medium and f. means for decoding and viewing 3-D stereo images.

2. A self-aligned printing system for producing 3-D stereo hard copy computer outputs of graphic images according to claim 1, wherein the photosensitive printing medium comprises a micro-polarizer array, µPol, sheet component, coated with a photo-sensitive emulsion, and backed by a polarization preserving reflective component. The two components are laminated together.

3. A self-aligned printing system for producing 3-D stereo hard copy computer outputs of graphic images according to claim 1, wherein the µPol sheet is based on the absorptive polarizing class that is made of polyvinyl alcohol, PVA.

4. A self-aligned printing system for producing 3-D stereo hard copy computer outputs of graphic images according to claim 1, wherein the µPol sheet is based on the reflective polarizing class that is made of cholesteric liquid crystal silicone, CLCS, polymer.

5. A self-aligned printing system for producing 3-D stereo hard copy computer outputs of graphic images according to claim 1, wherein the print heads are based on cathode ray tube image source technology.

6. A self-aligned printing system for producing 3-D stereo hard copy computer outputs of graphic images according to claim 1, wherein the print heads are based on liquid crystal image source technology.

7. A self-aligned printing system for producing 3-D stereo hard copy computer outputs of graphic images according to claim 1, wherein the print heads are based on liquid crystal light valve technology.

8. A self-aligned printing system for producing 3-D stereo hard copy computer outputs of graphic images according to claim 1, wherein the print heads are based on modulated scanned laser beam technology.

9. A self-aligned printing system for producing 3-D stereo hard copy computer outputs of graphic images according to claim 2, wherein the photosensitive emulsion is based on the dry silver halides technology.

10. A self-aligned printing system for producing 3-D stereo hard copy computer outputs of graphic images according to claim 2, wherein the photosensitive emulsion is based on Mead's Cycolor micro-capsule technology.

11. A self-aligned printing system for producing 3-D stereo hard copy computer outputs of graphic images according to claim 2, wherein the photosensitive emulsion is based on the Polaroid's instant photography technology.

12. A self-aligned printing system for producing 3-D stereo hard copy computer outputs of graphic images according to claim 2, wherein the photosensitive emulsion is based on conventional wet silver halides technology.

13. A self-aligned printing system for producing 3-D stereo hard copy computer outputs of graphic images according to claim 1, wherein the means for decoding and viewing the 3-D stereo image comprises the µPol of the printing medium and a pair of polarized eye glasses.

14. A self-aligned printing system for producing 3-D stereo hard copy computer outputs of graphic images in response to applying the left and right perspectives of an imaged object sequentially to its input, comprising:

a. Photo-sensitive printing medium comprising at least one component;

b. A single print head which sequentially produces left and right images having two polarization states P1 and P2. The polarized images are used to sequentially expose the printing medium and to record said images on said printing medium;

c. means for producing variable polarization states; and used to sequentially polarize the left and right images from the print head with states P1 and P2 respectively;

d. Micro-polarizer array (µPol) sheets in direct contact with and laminated to the printing medium are used to carry out the spatial multiplexing and the spatial demultiplexing functions;

e. means for feeding, transporting, and combining components of printing medium;

f. means for developing the exposed printing medium and g. means for decoding and viewing 3-D stereo images.

* * * * *